United States Patent
Filippov et al.

(10) Patent No.: US 9,556,053 B2
(45) Date of Patent: Jan. 31, 2017

(54) METHOD AND APPARATUS FOR MINIMIZING INCLUSIONS IN A GLASS MAKING PROCESS

(71) Applicant: Corning Incorporated, Corning, NY (US)

(72) Inventors: Andrey V Filippov, Houston, TX (US); Chunhong Chelsie He, Horseheads, NY (US); Bulent Kocatulum, Horseheads, NY (US); Kathleen Elizabeth Morse, Painted Post, NY (US); Liming Wang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/155,196

(22) Filed: May 16, 2016

(65) Prior Publication Data

US 2016/0257596 A1 Sep. 8, 2016

Related U.S. Application Data

(62) Division of application No. 15/016,973, filed on Feb. 5, 2016, now Pat. No. 9,416,039, which is a division of application No. 12/152,930, filed on May 19, 2008, now Pat. No. 9,284,209.

(60) Provisional application No. 60/930,765, filed on May 18, 2007.

(51) Int. Cl.
*C03B 17/06* (2006.01)

(52) U.S. Cl.
CPC .................. *C03B 17/064* (2013.01)

(58) Field of Classification Search
CPC ....... C03B 17/064; C03B 17/067; C03B 17/06
See application file for complete search history.

(56) References Cited

U.S. PATENT DOCUMENTS

| 2,598,894 A | 6/1952 | Drake |
| 3,338,696 A | 8/1967 | Dockerty |
| 3,397,974 A * | 8/1968 | Zellers, Jr. .............. C03B 15/04 65/162 |

(Continued)

FOREIGN PATENT DOCUMENTS

| EP | 1746076 A1 | 1/2007 |
| JP | 59078984 A | 5/1984 |

(Continued)

OTHER PUBLICATIONS

New Method of Producing Flat Glass. (1984): 9-10. Web. Feb. 22, 2012. <http://www.cnki.net>.

*Primary Examiner* — Jodi C Franklin
(74) *Attorney, Agent, or Firm* — Kevin M. Able

(57) ABSTRACT

A method for forming a glass sheet with reduced inclusions is disclosed. The method includes flowing molten glass over converging forming surfaces of a forming body positioned within an enclosure. The forming body is heated with a plurality of heating elements separated from the forming body by an inner wall of the enclosure. The temperature $T_2$ at the bottom of the forming body is decoupled from the temperature $T_1$ at the top of the forming body by an insulating thermal barrier positioned between two adjacent heating elements of the plurality of heating elements such that a change in $T_2$ does not cause a substantial change in $T_1$.

20 Claims, 9 Drawing Sheets

(56) References Cited

U.S. PATENT DOCUMENTS

| | | | |
|---|---|---|---|
| 3,506,429 A * | 4/1970 | Overman | C03B 17/064 65/128 |
| 3,682,609 A * | 8/1972 | Dockerty | C30B 7/067 65/203 |
| 5,562,749 A | 10/1996 | Gessler, II et al. | |
| 6,720,530 B2 | 4/2004 | Taniguchi et al. | |
| 6,748,765 B2 | 6/2004 | Pitbladdo | |
| 6,990,834 B2 | 1/2006 | Pitbladdo | |
| 8,269,131 B2 | 9/2012 | Adelsberg et al. | |
| 8,931,309 B2 * | 1/2015 | Abdul-Rahman | C03B 17/061 65/203 |
| 2003/0121287 A1 | 7/2003 | Chalk et al. | |
| 2004/0065115 A1 * | 4/2004 | Mueller | C03B 17/06 65/29.17 |
| 2004/0206742 A1 | 10/2004 | Duba | |
| 2006/0016219 A1 | 1/2006 | Pitbladdo | |
| 2007/0068197 A1 * | 3/2007 | Pitbladdo | C03B 17/064 65/90 |
| 2007/0130994 A1 * | 6/2007 | Boratav | C03B 17/064 65/29.21 |
| 2008/0282736 A1 * | 11/2008 | Filippov | C03B 17/064 65/90 |
| 2011/0126587 A1 * | 6/2011 | Berkey | G05B 21/02 65/29.21 |
| 2013/0255321 A1 * | 10/2013 | Kocatulum | C03B 17/061 65/195 |

FOREIGN PATENT DOCUMENTS

| | | |
|---|---|---|
| JP | 03009751 | 1/1991 |
| JP | 2001031434 A | 2/2001 |
| JP | 2007112665 A | 5/2007 |
| JP | 05046929 B2 | 10/2010 |
| WO | 03051783 A | 6/2003 |
| WO | 2005110934 A2 | 11/2005 |

* cited by examiner

METHOD AND APPARATUS FOR MINIMIZING INCLUSIONS IN A GLASS MAKING PROCESS

CROSS-REFERENCE TO RELATED APPLICATIONS

This application is a divisional of U.S. application Ser. No. 15/016,973, filed on Feb. 5, 2016, which is a divisional of U.S. application Ser. No. 12/152,930, filed on May 19, 2008, which in turn claims the benefit of priority under 35 U.S.C. §119 of U.S. Provisional Application Ser. No. 60/930,765, filed on May 18, 2007, the contents of which are relied upon and incorporated herein by reference in their entireties.

BACKGROUND OF THE INVENTION

Field of the Invention

This invention relates to fusion processes for producing sheet glass and, in particular, to fusion processes which employ a crystalline ceramic isopipe. Even more particularly, the invention relates to controlling the formation of crystalline defects in sheet glass produced by fusion processes employing ceramic containing isopipes. The techniques of the invention are particularly useful when fusion processes are employed to produce glass sheets for use as substrates in the manufacture of liquid crystal displays, e.g., AMLCDs.

Technical Background

The fusion process is one of the basic techniques used in the glass making art to produce sheet glass. Compared to other processes known in the art, e.g., the float and slot draw processes, the fusion process produces glass sheets whose surfaces have superior flatness and smoothness. As a result, the fusion process has become of particular importance in the production of the glass substrates used in the manufacture of liquid crystal displays (LCDs).

The fusion process, specifically, the overflow downdraw fusion process, is the subject of commonly assigned U.S. Pat. Nos. 3,338,696 and 3,682,609, to Stuart M. Dockerty. As described therein, molten glass is supplied to a trough formed in a refractory body known as an "isopipe".

In an exemplary fusion downdraw process as described in the Dockerty patent, once steady state operation has been achieved, molten glass overflows the top of the trough on both sides so as to form two half sheets of glass that flow downward and then inward along the outer surfaces of the isopipe. The two sheets meet at the bottom or root of the isopipe, where they fuse together into a single glass sheet. The single sheet is then fed to drawing equipment which controls the thickness of the sheet by the rate at which the sheet is drawn away from the root. The drawing equipment is located sufficiently downstream of the root so that the single sheet has cooled before coming into contact with the equipment.

The outer surfaces of the final glass sheet do not contact any part of the outside surface of the isopipe during any part of the process. Rather, these surfaces see only the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

An isopipe used in the fusion process is subjected to high temperatures and substantial mechanical loads as molten glass flows into its trough and over its outer surfaces. To be able to withstand these demanding conditions, the isopipe is typically and preferably made from an isostatically pressed block of a refractory material (hence the name "iso-pipe"). In particular, the isopipe is preferably made from an isostatically pressed zircon refractory, i.e., a refractory composed primarily of $ZrO_2$ and $SiO_2$. For example, the isopipe can be made of a zircon refractory in which $ZrO_2$ and $SiO_2$ together comprise at least 95 wt. % of the material, with the theoretical composition of the material being $ZrO_2.SiO_2$ or, equivalently, $ZrSiO_4$.

A source of losses in the manufacture of sheet glass for use as LCD substrates is the presence of zircon crystal inclusions (referred to herein as "secondary zircon crystals" or "secondary zircon defects") in the glass as a result of the glass' passage into and over the zircon isopipe used in the manufacturing process. The problem of secondary zircon crystals becomes more pronounced with devitrification-sensitive glasses which need to be formed at higher temperatures.

Zircon which results in the zircon crystals which are found in the finished glass sheets has its origin at the upper portions of the zircon isopipe. In particular, these defects ultimately arise as a result of zirconia (i.e., $ZrO_2$ and/or $Zr^{+4}+2O^{-2}$) dissolving into the molten glass at the temperatures and viscosities that exist in the isopipe's trough and along the upper walls (weirs) on the outside of the isopipe. The temperature of the glass is higher and its viscosity is lower at these portions of the isopipe as compared to the isopipe's lower portions since as the glass travels down the isopipe, it cools and becomes more viscous.

The solubility and diffusivity of zirconia in molten glass is a function of the glass' temperature and viscosity (i.e., as the temperature of the glass decreases and the viscosity increases, less zirconia can be held in solution and the rate of diffusion decreases). As the glass nears the bottom (root) of the isopipe, it may become supersaturated with zirconia. As a result, zircon crystals (i.e., secondary zircon crystals) nucleate and grow on the bottom portion (e.g. root) of the zircon isopipe. Eventually these crystals grow long enough to break off into the glass flow and become defects at or near the fusion line of the sheet. Moreover, if the temperature of the glass at the isopipe root is too low, devitrification of the glass may occur. Thus, it is desirable to increase the temperature of the isopipe near the isopipe root. Unfortunately, raising the temperature near the root of the isopipe has had the unpleasant effect of also increasing the temperature of the molten glass within the isopipe trough, decreasing the viscosity of the glass and hence impacting the mass flow distribution of the glass. This change in mass flow distribution can be compensated by tilting the isopipe, but only within a narrow range of angles. Heating at the top of the isopipe occurs because the heating elements typically used to modify the temperature of the glass flowing down the sides of the isopipe are contained within a common plenum. As illustrated in FIG. 1, an isopipe 10, as commonly used today, comprises a plurality of heating elements 12a-12d and 14a-14d distributed upward from root 14 along both sides of the isopipe. Heating elements 12a-12d and 14a-14d are contained within the structure of enclosure 16 and more particularly within common plenum 18. As a result, an increase in the temperature of the bottom-most heating element has a noticeable effect on the temperature at the top of isopipe 10.

SUMMARY

In accordance with an embodiment of the invention, an apparatus for forming a glass sheet is disclosed comprising a forming wedge comprising weirs at the top of the forming wedge and forming surfaces that converge to a root at the bottom of the forming wedge, a plurality of heating elements disposed between the root and the weirs, an enclosure disposed about the forming wedge, the enclosure comprising an inner wall separating the forming wedge and the heating elements, a thermal barrier comprising a thermal resistance rating (RSI) greater than about 0.0004 K*m$^2$/W disposed between a bottom-most heating element of the plurality of heating elements and an adjacent heating element above the bottom-most heating element, where K is in degrees Kelvin and W is in watts.

In another embodiment of the present invention, an apparatus for forming a glass sheet is described comprising a forming wedge comprising weirs at the top of the forming wedge and forming surfaces that converge to a root at the bottom of the forming wedge, a plurality of temperature modifying elements disposed between the root and the weirs, an enclosure disposed about the forming wedge, the enclosure comprising an inner wall separating the forming wedge and the temperature modifying elements, a thermal barrier comprising a thermal resistance rating (RSI) greater than about 0.0004 K*m$^2$/W disposed between a bottom-most temperature modifying element of the plurality of temperature modifying elements and an adjacent temperature modifying element above the bottom-most temperature modifying element, where K is in degrees Kelvin and W is in watts.

In still another embodiment, a method of making a glass sheet is disclosed comprising flowing a molten glass over a forming body comprising converging forming surfaces, forming a vertical temperature gradient between a temperature $T_1$ at the top of the forming body and a temperature $T_2$ at the bottom of the forming body, drawing the molten glass from the bottom of the forming body to form a glass sheet, and wherein the temperature $T_2$ at the bottom of the forming body is substantially decoupled from the temperature $T_1$ at the top of the forming body such that a change in $T_2$ does not cause a substantial change in $T_1$.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate an exemplary embodiment of the invention and, together with the description, serve to explain the principles and operations of the invention.

DETAILED DESCRIPTION

Figure 1:
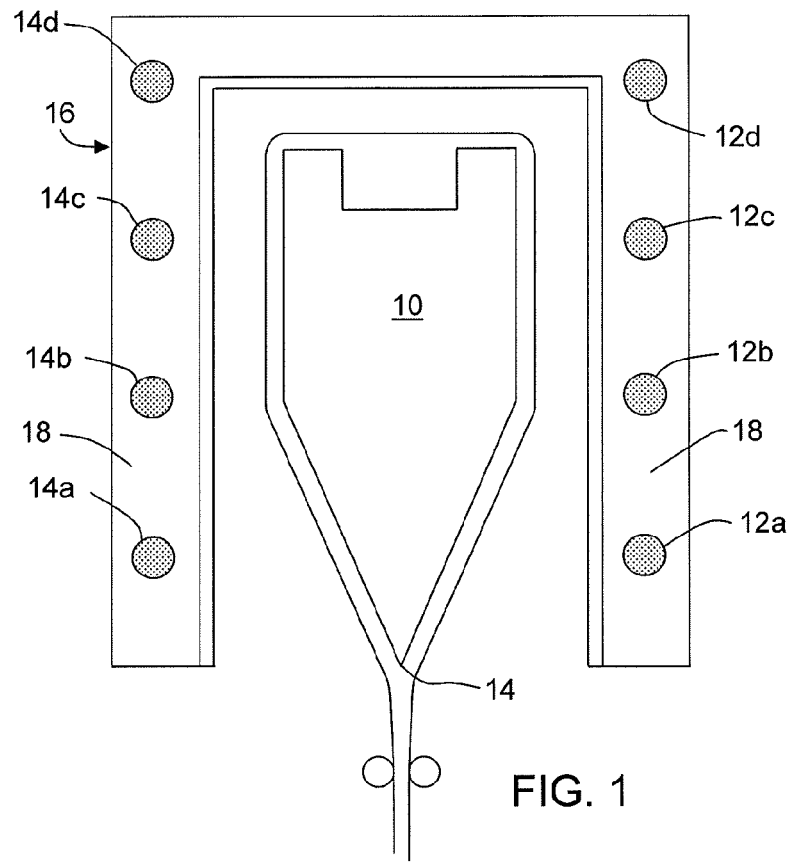
FIG. 1 is a cross sectional drawing illustrating a conventional isopipe housed in a conventional enclosure without insulating thermal barriers between heating elements.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As previously described in reference to FIG. 1, prior art enclosure designs for fusion glass forming machines have incorporated heating elements 12a-12d and 14a-14d in a common, interconnected plenum 18. Since heat rises, the upper portion of plenum 18 and enclosure 16 is heated with a contribution from all heating elements within the common plenum by both radiation and convection. Heat energy which might otherwise be directed toward the sides or converging forming surfaces of isopipe 10 by the bottom-most heating elements 12a, 14a is instead lost to the upper portions of isopipe 10 through common plenum 18. Hence, the upper portions of the isopipe, and the molten glass overflowing the upper portions, receive more heat, while the lower portions of the isopipe receive less heat. This offset in heating may lead to an unacceptably large temperature differential $\Delta T$ between the upper and lower portions of the isopipe, when in fact a small $\Delta T$ is sought.

It is known that the temperature difference between the glass at the top of the isopipe and the glass at the bottom of the isopipe should be minimized to reduce the amount of isopipe material (typically a crystalline ceramic material, such as zircon) that is dissolved into the molten glass flowing over the surfaces of the isopipe. See for example, U.S. Patent Publication No. 2003/0121287, the contents of which are incorporated herein by reference.

Inclusions in the molten glass can occur when the amount of dissolved isopipe material exceeds the saturation level for the given glass conditions. If, for example, the isopipe is formed from zircon, zircon crystal growth at the bottom of the isopipe may be promoted. The dissolved material comes out of solution and may be deposited as crystals on the surface of the isopipe. If allowed to grow sufficiently large, these crystals may break off and become entrained in the glass flow. This is unacceptable from a quality perspective. The following description assumes a zircon isopipe, but it can be appreciated that the invention described herein in various embodiments is applicable to isopipes formed from other materials.

Since two key contributing factors for the dissolution of the isopipe are time and temperature, one way to eliminate the re-growth of the isopipe constituent material is to reduce the maximum temperature of the glass in or on the isopipe, particularly at the hotter upper portions. At the same time, the temperature of the flowing glass must be maintained above the liquidus temperature of the glass at the lower extremes of the isopipe—the root region—to prevent devitrification of the glass. Thus, it is desirable to increase the temperature of the glass at the bottom of the isopipe while simultaneously decreasing the temperature of the glass flowing over the top of the isopipe: in other words, to reduce the temperature differential or gradient between the top of the isopipe and the bottom of the isopipe.

Another reason for controlling the temperature differential between the weir and root is to facilitate startup of the fusion draw machine. That is, to heat the isopipe to its appropriate operating temperature, for example, after a repair shutdown. The isopipe is, generally a monolithic block of a refractory material, that if not heated substantially uniformly, may crack during heat up resulting from thermal stresses. In a conventional fusion draw machine, an increase in the power supplied to the bottom-most heating element(s) to raise the temperature of the root region also increases the temperature at the top of the isopipe, potentially increasing the temperature differential between the weirs and root. Thus, the temperature at the top of the isopipe becomes the controlling factor during isopipe heat up. By reducing the coupling between the temperature at the top of the isopipe from the temperature at the bottom of the isopipe, the temperature differential between the top and bottom of the isopipe, and stresses resulting from uneven heating, can be reduced.

Figure 2:
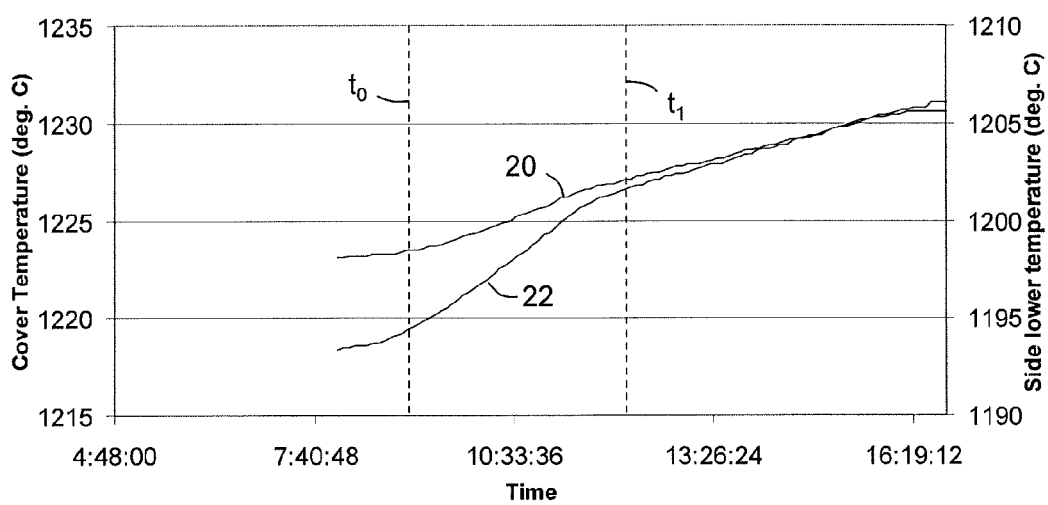
FIG. 2 is a plot showing temperature coupling between upper and lower locations within the enclosure of FIG. 1.

Attempts to reduce the temperature differential between the weirs and the root may be difficult, since increasing the power directed to the bottom-most heating elements to raise the temperature of the root typically also increases the temperature at the weirs as previously described. Thus, the temperature at the isopipe root is effectively coupled to the temperature at the isopipe weirs. This can be seen more clearly with the aid of FIG. 2, where FIG. 2 depicts temperature at two locations proximate an exemplary isopipe as a function of absolute time. Curve 20 depicts the temperature at the ceiling of enclosure 16 proximate the top of isopipe 10, whereas curve 22 depicts the temperature proximate the root of the isopipe. The temperature scale at the left of FIG. 2 corresponds to curve 20 while the scale at the right of FIG. 2 corresponds to curve 22. In the present experiment, the electrical power to the upper heating elements (e.g. 12b-12d and 14b-14d in FIG. 1) was maintained constant over the time interval $t_0$ to $t_1$, while the power to the bottom-most heating elements (e.g. heating elements 12a, 14a) was increased over the same time interval. As expected, the temperature at the lower portion of the isopipe, proximate the root, increases during the interval $t_0$ to $t_1$; a total of about 7° C. over a period of approximately 3 hours. Also very clearly shown is that the temperature proximate the top of the isopipe also increased over that period of time, about 4° C., demonstrating the temperature coupling between the two regions of the enclosure. The present invention is directed toward uncoupling these upper and lower temperatures. Preferably, by practicing the present invention, an increase in temperature at the bottom of the isopipe of about 1° C. per hour results in an increase in temperature at the top of the isopipe of less than about 0.5° C. per hour.

Figure 3:
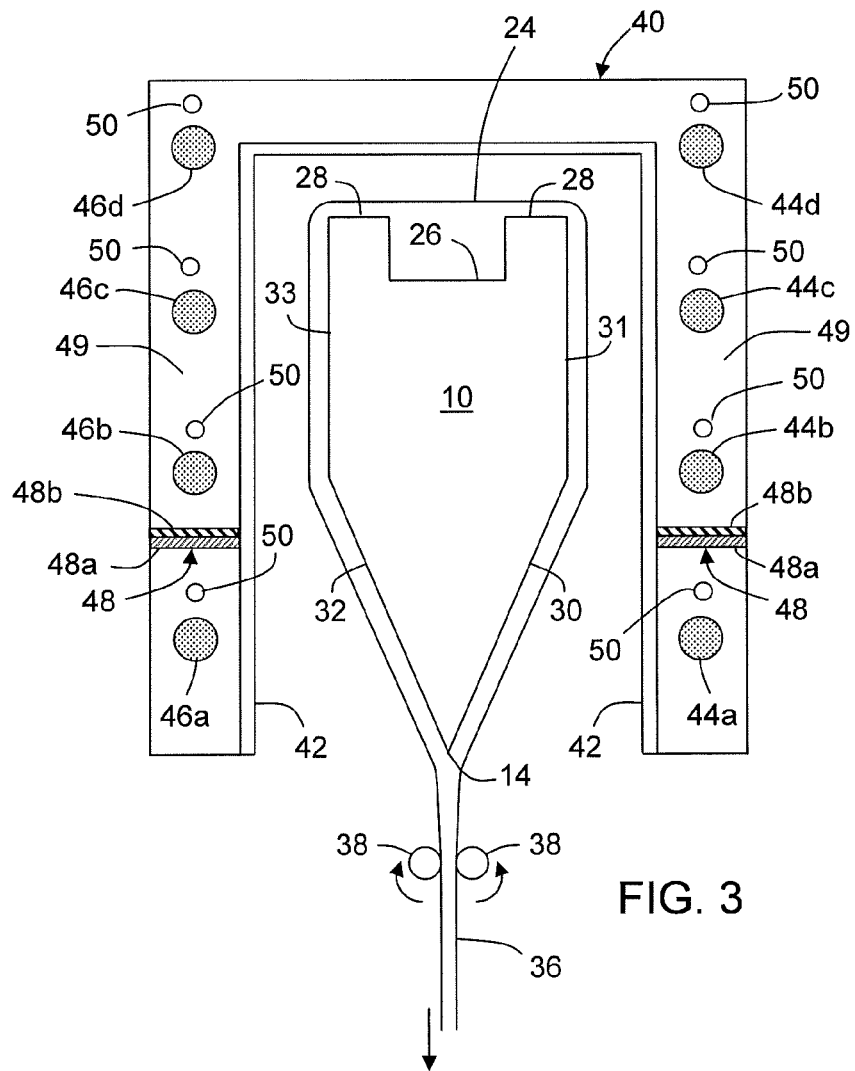
FIG. 3 is a cross sectional view of an enclosure comprising insulating thermal barriers in accordance with an embodiment of the present invention.

In accordance with an embodiment of the present invention, and as illustrated in FIG. 3, an exemplary glass forming apparatus is shown wherein molten glass 24 is supplied to trough 26 defined by weirs 28 of refractory body 10 (isopipe 10). Molten glass 24 overflows the top of weirs 28 on both sides of the isopipe to form two sheets of glass that flow downward and then inward along the outer surfaces of the isopipe, including converging forming surfaces 30, 32 and vertical forming surfaces 31, 33. The line of intersection between forming surfaces 30, 31 and between 32, 33 is referred to as the "break" B. Converging forming surfaces 30, 32 meet at root 14. The two sheets of molten glass flowing over the weirs and the forming surfaces meet at root 14, where they fuse together into single glass sheet 36. Glass sheet 36 is then fed to drawing equipment (shown as pulling rolls 38 in FIG. 3), which controls the thickness of the sheet by the rate at which the sheet is drawn away from root 14. The drawing equipment is located sufficiently downstream of the root so that the glass sheet has cooled sufficiently to become substantially rigid before coming into contact with the drawing equipment.

The glass forming process described supra is known as a fusion downdraw process. As can be seen from FIG. 3, the outer surfaces of the glass flowing over the sides of the isopipe do not contact any part of the outside surface of the isopipe. On the other hand, the inner surfaces of the two half sheets which form the final glass sheet do contact the isopipe, but those inner surfaces fuse together at the root of the isopipe and are thus buried in the body of the final sheet. In this way, the superior properties of the outer surfaces of the final glass sheet obtainable with a fusion process are achieved.

Isopipe 10 is further disposed within enclosure 40. Enclosure 40 substantially surrounds isopipe 10 and is used to maintain and control the temperature of the isopipe and the overflowing molten glass 24. Enclosure 40 comprises inner shield wall 42, and heating elements 44a-44d and 46a-46d distributed at a vertical elevation above root 14 but behind inner wall 42 such that inner wall 42 separates heating elements 44a-44d and 46a-46d from isopipe 10. While four heating elements are shown per side of the isopipe, there may be more than or less than four heating elements per side. Additional heating elements may be deployed below the root. Enclosure inner wall 42 is sometimes referred to as muffle 42. Inner wall or muffle 42 preferably comprises a temperature resistant, but heat conductive, material and serves to diffuse the heat absorbed from heating elements 44a-44d and 46a-46d, and provide more even heating to isopipe 10. For example, SiC or hexaloy is a suitable material for inner wall 42. Heating elements 44a-44d and 46a-46d may be, for example, electrically resistive heating elements and may comprise metal bars (glow bars) extending horizontally along the width of isopipe 10 (from one longitudinal end of the isopipe to the other longitudinal end of the isopipe), and connected to a suitable electrical supply.

Each of the plurality of heating elements 44a-44d and 46a-46d shown in FIG. 3 is preferably individually controlled using appropriate well-known heating control methods and equipment. Heating elements 44a-44d and 46a-46d may for example, be manually controlled, thermostatically controlled, or preferably computer controlled so that an appropriate temperature profile may be more easily maintained within enclosure 40.

Figure 4:
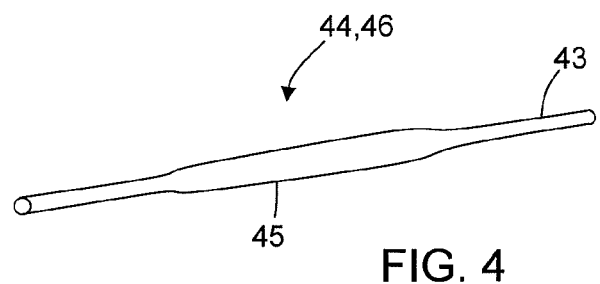
FIG. 4 is a side perspective view of a heating element (glow bar) having a non-uniform cross sectional shape so that the ends of the glow bars produce more heat than the center of the glow bar.

Since the glass sheet drawn from the isopipe tends to have a hotter temperature at the center of the sheet that at the edges of the sheet, a high temperature at the ends of the heating elements serves to better equalize the temperature across the width of the glass sheet. This can be effective to reduce stress in the sheet and reduce stress induced shape, or distortion (e.g. bowing) of the sheet. To that end, one or more of heating elements 44a-44d and 46a-46d may have a cross sectional shape or profile which varies along the length of the heating element or elements such that the heat radiated from the ends of the heating elements is greater than the heat radiated from the center of the heating elements. For example, bottom-most heating elements 44a, 46a may be adapted such that the resistance of the heating elements at the ends of the elements are higher than the resistance of the heating elements at the center of the elements. One way of attaining a varying electrical resistance is to vary the cross-sectional area of the heating element along the length of the heating element. FIG. 4 shows a heating element (generically 44, 46) having end portion 43 with a reduced cross sectional area when compared to a center portion 45 having a larger cross sectional area. Thus, for a given electrical current traversing the heating elements, the ends of the heating element will be heated more than the center of the heating elements, assuming a homogeneous material. Alternatively, one or more of the heating elements may comprise multiple electrically conductive materials with different electrical resistances.

Referring again to FIG. 3, an insulating barrier 48 is provided within the enclosure plenum 49 to thermally isolate the bottom-most heating elements 44a, 46a from the remainder of the heating elements of enclosure 40. That is, to thermally isolate heating elements 44a and 46a from heating elements 44b-44d and 46b-46d, respectively, and aid in decoupling the temperature at the top portions of the isopipe from the bottom portions of the isopipe. As a result, the upper portions (e.g. weirs 28) of the isopipe become cooler because they receive less heat from the bottom-most heating elements 44a, 46a, and the lower portions of the isopipe (e.g. converging forming surfaces 30, 32 and root 34) become hotter because they receive more of the power from the bottom-most heating elements. The difference in temperature ΔT between the upper portion of the isopipe (trough and weirs), and the lower portions of the isopipe (e.g. converging forming surfaces and the isopipe root), and therefore the ΔT of the molten glass flowing over them, is reduced. In general terms, for the upper portions of the isopipe (e,g, trough and weirs), the measured temperature of the glass will be about the same as the temperature of the outer surface of the isopipe, while for the lower portions (e.g. converging forming surfaces and root), the temperature of the glass will typically be lower than the temperature of the outer surface of the isopipe.

Insulating barrier 48 may be comprised of one or more layers. For example, one layer may be a layer that provides structural integrity or strength to the barrier, while another layer or layers provides the majority of the insulating properties of the barrier. It has been found that a SiC barrier, for example, in and of itself is insufficient to provide the needed thermal properties. Thus, in some embodiments, insulating thermal barrier 48 comprises a structural layer 48a (e.g. SiC) and a thermally insulating layer 48b. The structural layer preferably supports the insulating layer. Additionally, since heating elements occasionally fracture and fall, the structural layer beneficially provides some mechanical protection to the bottom-most heating elements, and components of the fusion draw machine below insulating thermal barrier 48. The insulating layer may comprise, for example, a high temperature ceramic fiberboard, such as Duraboard® 2600. Preferably, insulating thermal barrier 48 has a thermal resistance value rating (RSI) greater than about 0.0004 K*m$^2$/W, more preferably greater than about 0.01 K*m$^2$/W, and even more preferably greater than about 0.09 K*m$^2$/W, where K is degrees Kelvin and W is watts. By way of example and not limitation, a Duraboard® 2600 thermal insulating layer having a thickness of approximately 2.5 cm has been shown to have an RSI of at least about 0.09 K*m$^2$/W.

The reduced weir temperature derived from practicing the present invention results in reduced dissolution of isopipe constituent material, e.g. zirconia, into the flowing molten glass, and an increased temperature at the isopipe root results in less precipitated material, e.g. zircon crystals, at the root of the isopipe. It should be noted that although specific examples used herein are generally related to zircon-containing isopipes, the present invention is useful for mitigating dissolution and precipitation of other isopipe materials that may be present as well. Preferably, the presence of precipitated contaminants/inclusions in the finished glass is limited to less than about 0.3 defects per pound of finished glass, more preferably less than about 0.1 defects per pound of finished glass, and even more preferably below about 0.09 defects per pound of finished glass. Additionally, decoupling the weir temperature from the root temperature can facilitate a reduction in weir temperature without decreasing the temperature of the root. For example, power to the upper heating elements may be subsequently reduced. Thus, the forming of glasses having smaller viscosity ranges between the viscosity of the glass delivered to the isopipe and the liquidus viscosity of the glass may be possible. Moreover, by maintaining a lower trough/weir temperature, while at the same time enabling a higher root temperature, sag or creep of the isopipe material can be decreased, thereby prolonging the life of the isopipe.

Enclosure 40 may also include active cooling elements 50 such as piping for conveying a cooling fluid through the enclosure from a cooling fluid source (not shown), such as a chill water source. The cooling elements may be in addition to the heating elements, or they may replace one or more heating elements. As with the heating elements, cooling elements 50 may be individually controlled.

Figure 5:
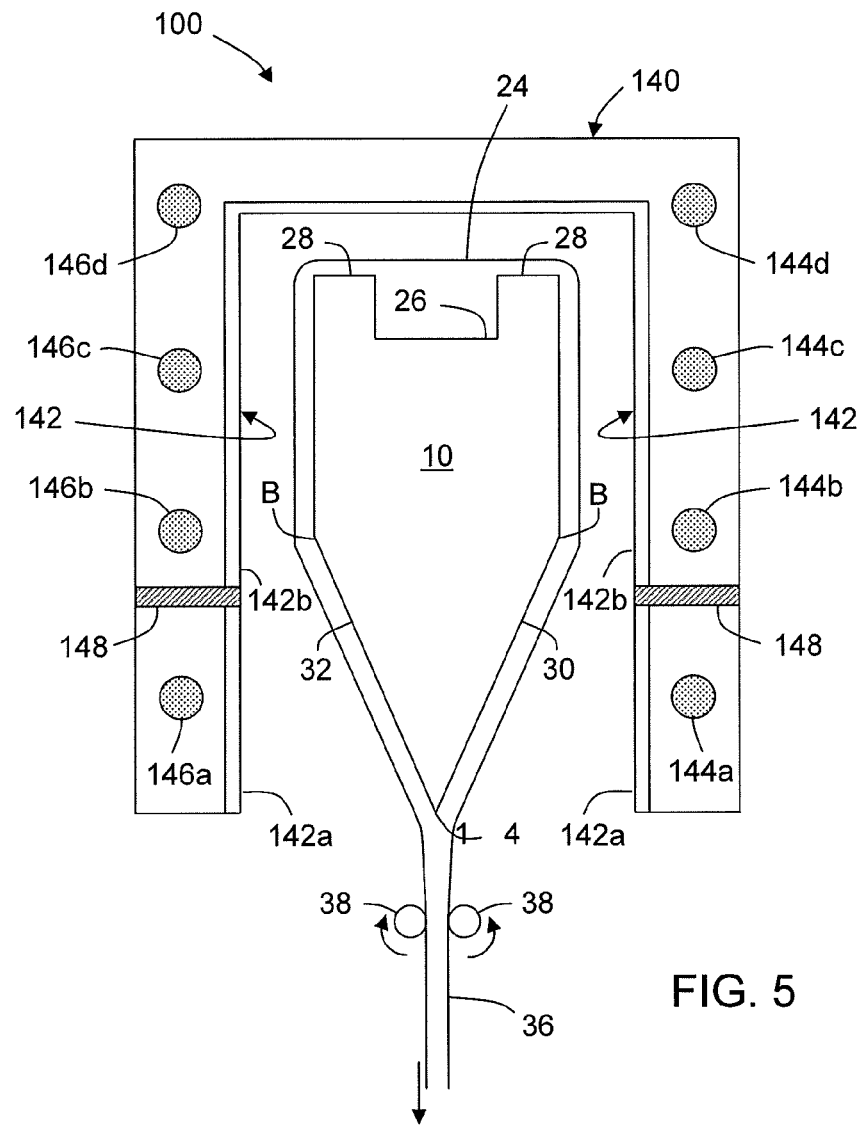
FIG. 5 is a cross sectional view of another enclosure comprising insulating thermal barriers in accordance with an embodiment of the present invention.

In some embodiments, the inner wall itself may be segmented such that one portion of the inner wall is separated from another portion of the inner wall by an insulating barrier, as shown in FIG. 5. FIG. 5 illustrates apparatus 100 comprising enclosure 140, inner shield wall 142 and isopipe 10 disposed within enclosure 140. Enclosure 140 also includes insulating thermal barriers 148 disposed between heating elements 144a (and 146a) and heating elements 144b (and 146b). Insulating thermal barrier 148 is extended so as to divide inner wall 142 into a lower portion 142a and an upper portion 142b. As in the previous embodiment, insulating thermal barrier 148 may comprise multiple layers, including a structural layer and an insulating layer. Preferably, insulating thermal barrier 148 has a thermal resistance value rating (RSI) greater than about 0.0004 K*m$^2$/W, more preferably greater than about 0.01 K*m$^2$/W, and even more preferably greater than about 0.09 K*m$^2$/W.

Each of the plurality of heating elements 144a-144d and 146a-146d shown in FIG. 5 is preferably individually controlled using appropriate well-known heating control methods and equipment. As previously described, one or more of heating elements 144a-144d and 146a-146d may be adapted such that more heat is radiated from the ends of the heating elements (corresponding to the edges of the glass sheet), than fro the center portions of the heating elements (corresponding to the central or quality area of the glass sheet). Although not shown, apparatus 100 may employ active cooling as in the previous embodiment.

Figure 6:
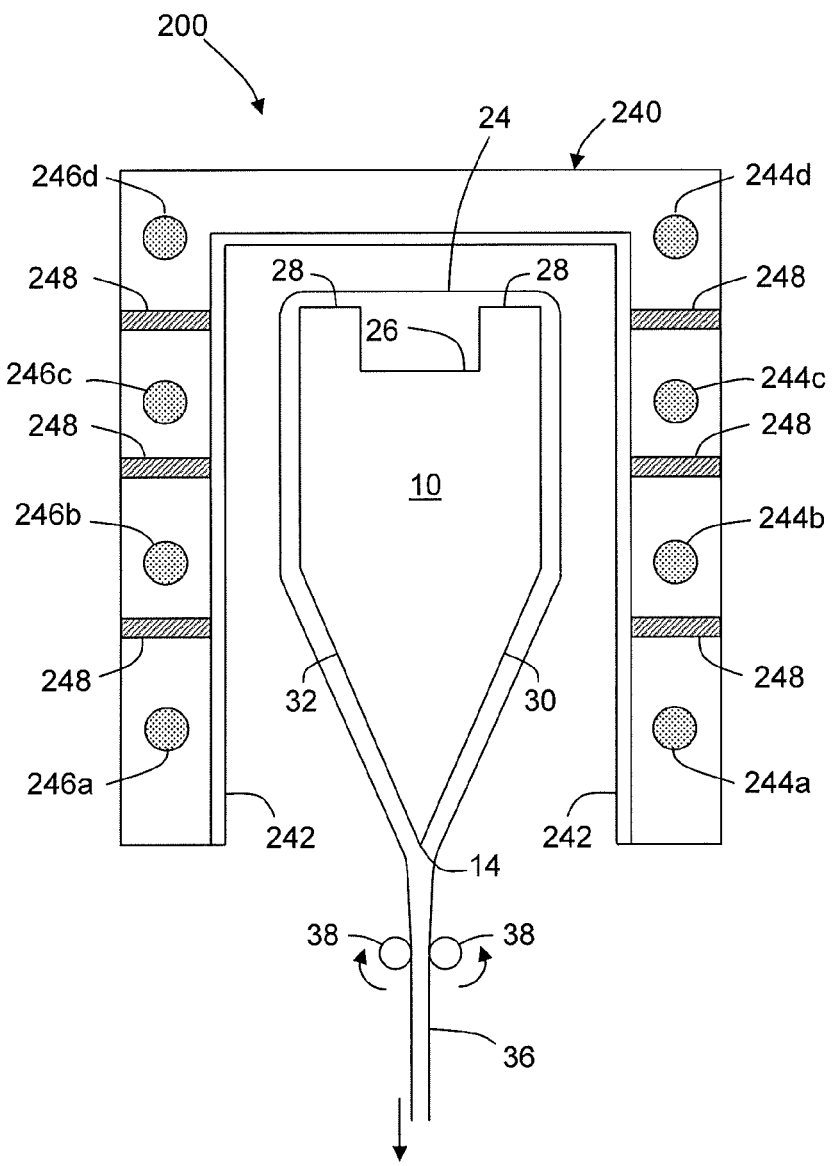
FIG. 6 is a cross sectional view of an enclosure comprising insulating thermal barriers in accordance with still another embodiment of the present invention.

In another embodiment, shown in FIG. 6, an apparatus 200 is depicted comprising enclosure 240, inner shield wall 242 and isopipe 10 disposed within enclosure 240. Enclosure 240 also includes a plurality of insulating thermal barriers 248 disposed between adjacent heating elements. Each insulating thermal barrier 248 may comprise multiple layers, including an insulating layer and, optionally, a structural layer. Preferably, each insulating thermal barrier 248 has a thermal resistance value rating (RSI) greater than about 0.0004 K*m$^2$/W, more preferably greater than about 0.01 K*m$^2$/W, and even more preferably greater than about 0.09 K*m$^2$/W.

Each of the plurality of heating elements 244a-244d and 246a-246d shown in FIG. 6 is preferably individually controlled using appropriate well-known heating control methods and equipment. One or more of heating elements 244a-244d and 246a-246d may be adapted such that more heat is radiated from the ends of the heating elements (corresponding to the edges of the glass sheet), than from the center portions of the heating elements (corresponding to the central or quality area of the glass sheet). Although not shown, apparatus 200 may employ active cooling as in the previous embodiments.

Figure 7:
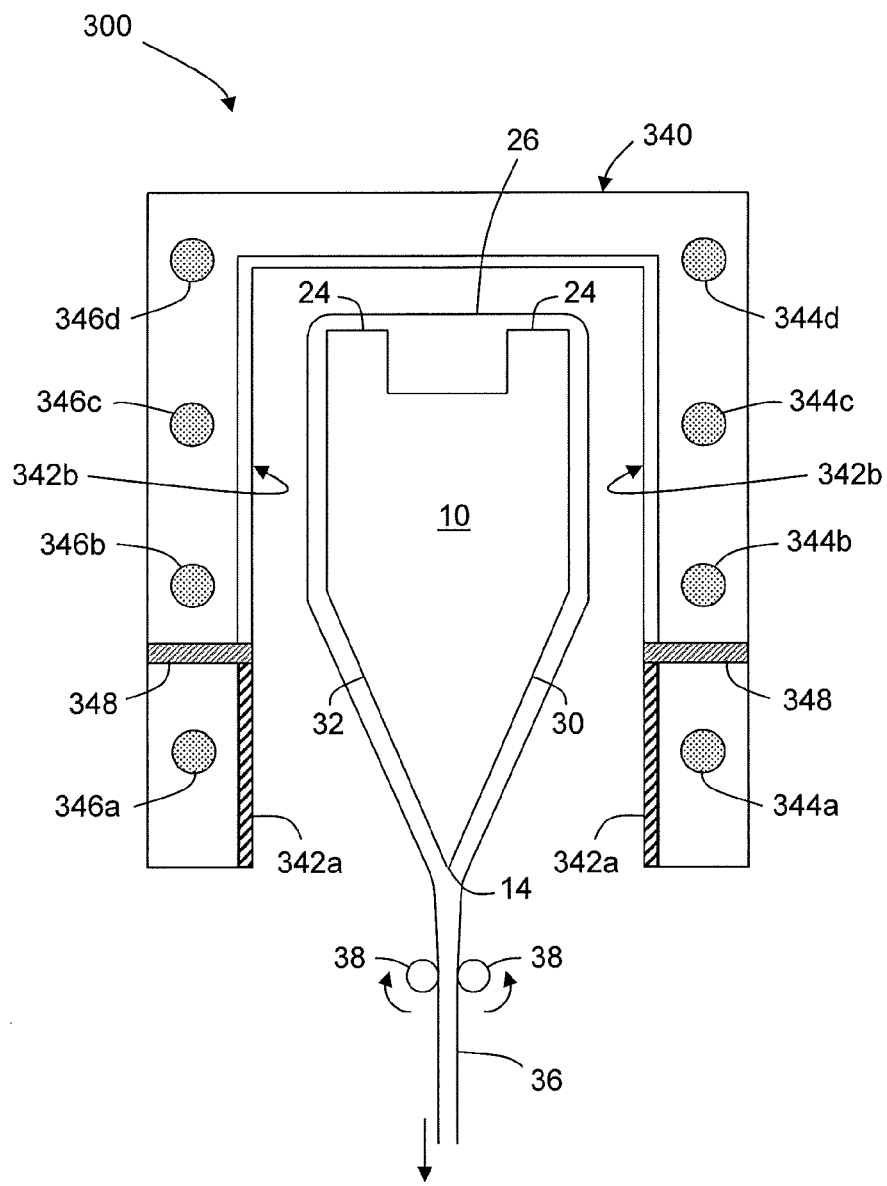
FIG. 7 is a cross sectional view of an enclosure comprising insulating thermal barriers and actively heated inner shield walls in accordance with an embodiment of the present invention.

In still another embodiment of the present invention depicted in FIG. 7, apparatus 300 is illustrated comprising enclosure 340, lower inner shield wall 342a, upper inner shield wall 342b and with isopipe 10 disposed within enclosure 340. Enclosure 340 also includes insulating thermal barrier 348 disposed between heating elements 344a (346a) and heating elements 344b (346b). Insulating thermal barrier 348 may comprise multiple layers, including an insulating layer and a structural layer. Preferably, the insulating thermal barrier 348 has a thermal resistance value rating (RSI) greater than about 0.0004 K*m$^2$/W, more preferably greater than about 0.01 K*m$^2$/W, and even more preferably greater than about 0.09 K*m$^2$/W.

Upper inner wall portion 342b is a passive conductor of heat from heating elements 344a-344d and 346a-346d, while lower inner wall portions 342a are themselves active heating elements. Active lower wall portions 342a may be directly heated by passing a current through the wall portions, or the active wall portions may have heating elements imbedded within or attached to the wall portions. Both actively heated wall portions 342a and heating elements 344a, 346a may be used in conjunction with each other, or one or the other of the wall portions 342a or the heating elements 344a, 346a may be deactivated.

Figure 8:
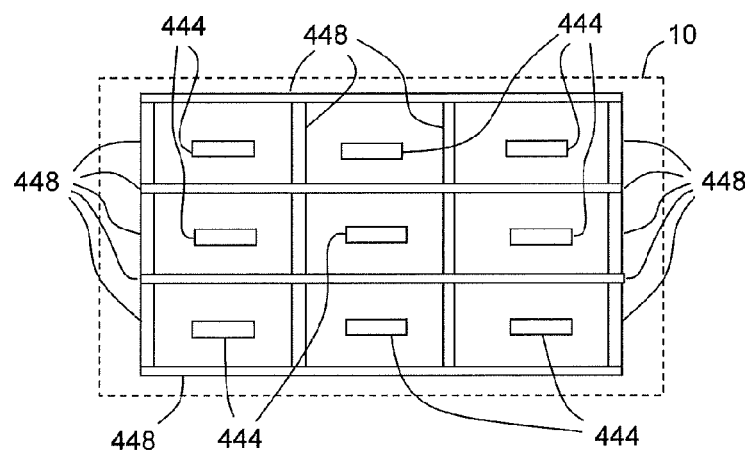
FIG. 8 is a side view of a grid of discrete heating elements separate horizontally and vertically by insulating thermal barriers in accordance with an embodiment of the present invention.

In yet another embodiment of the present invention, a plurality of heating elements may be extended both vertically and horizontally across the height and width of the isopipe as shown in FIG. 8, wherein each segmented heating element, generically indicated by reference numeral 444, is thermally isolated from an adjacent heating element by a plurality of vertical and horizontal thermal shields 448, thereby setting up a grid of thermally isolated heating elements. By individually controlling each individual heating element 444, a more refined temperature distribution can be implemented for isopipe 10, both across both the width and height of the isopipe. For example, different sections of the isopipe may be heated to higher or lower temperatures than other sections of the isopipe. Use of segmented heating elements can eliminate the need for elaborate methods of producing varied amounts of heat from different areas of a single heating element. Rather than utilizing a heating element with a varying cross sectional profile, for example, multiple heating elements may be employed across the desired space to achieve the same end.

Figure 9:
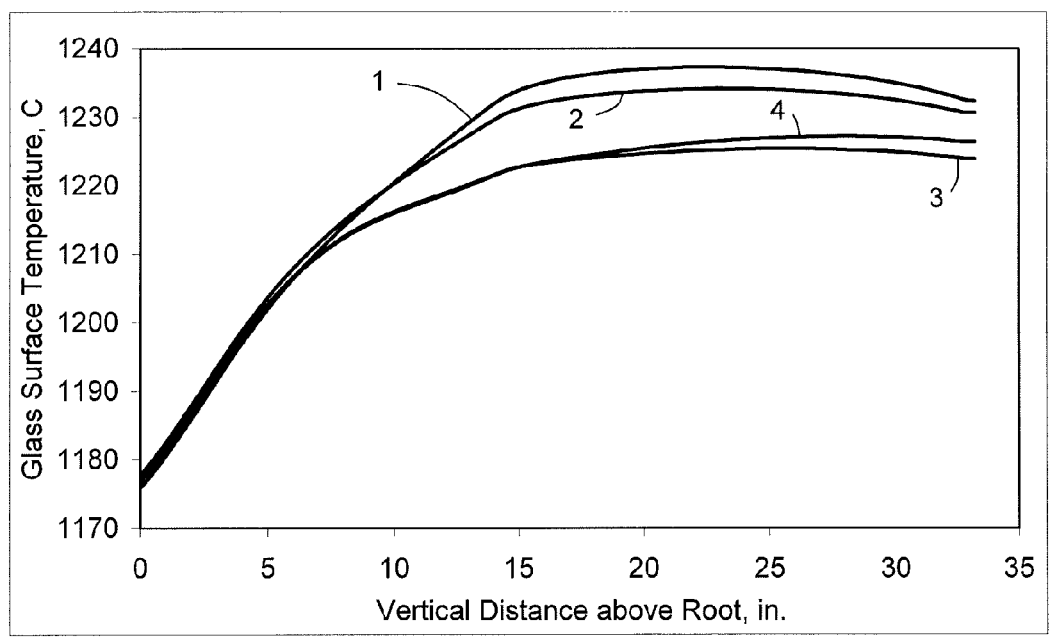
FIG. 9 is a plot of temperature as a function of vertical distance above the root of an isopipe under four conditions: (1) no insulating thermal barriers, (2) a structural layer only (3) an insulating thermal barrier in accordance with embodiments of the present invention and (4) insulating thermal barriers between adjacent heating elements according to certain embodiments of the present invention.

FIG. 9 illustrates modeled glass surface temperature data as a function of vertical distance above the root for an exemplary zircon isopipe utilizing methods and apparatus according to embodiments of the present invention. The data show four separate conditions (1) baseline data from a conventional isopipe, showing a temperature differential between the weirs and the root of the exemplary isopipe of 57° C., with a maximum temperature at the break; (2) data from an isopipe comprising a non-insulating barrier; (3) an insulating thermal barrier disposed between the bottom-most heating element and the vertically adjacent heating element above the bottom-most element according to an embodiment of the present invention and; (4) an insulating thermal barrier between adjacent heating elements. The data depict a temperature decrease at the upper portions of the isopipe for both the non-insulating barrier (2), and the insulating thermal barrier (3, 4) when compared to a common plenum (i.e. no barrier). However, data (2) for the non-insulating barrier indicate a decrease in temperature at the upper portion of the isopipe of only about 2° C.-3° C.;

for the insulating thermal barrier (3) the decrease in temperature is an additional 7° C.-9° C. improvement over the non-insulating barrier. Finally, while showing improvement (i.e. lower temperatures at the upper portions of the isopipe), the multiple insulating thermal barriers (4) produced somewhat poorer results when compared to the single insulating thermal barrier data (3). The data was modeled from the middle section of a zircon isopipe, with a hexaloy inner enclosure wall. The non-insulating barrier was a hexaloy plate approximately 10 mm thick. The insulating barrier was a layer of Duraboard having a thickness of 2.54 cm combined with the hexaloy barrier above. The electrical power provided to the heating elements was the same for the four situations. Numerical temperature results for the example above are contained in the following table. All temperatures are in ° C.

|  | (1) | (2) | (3) | (4) |
|---|---|---|---|---|
| Weir Temp. | 1232.3 | 1230.6 | 1223.9 | 1226.3 |
| Max. Temp. | 1237.2 | 1234.1 | 1225.4 | 1227.2 |
| Root Temp. | 1175.8 | 1177.2 | 1176.8 | 1176.8 |
| Weir-Root ΔT | 56.5 | 53.4 | 47.1 | 49.5 |
| Max-Root ΔT | 61.4 | 56.9 | 48.6 | 50.4 |

Figure 10:
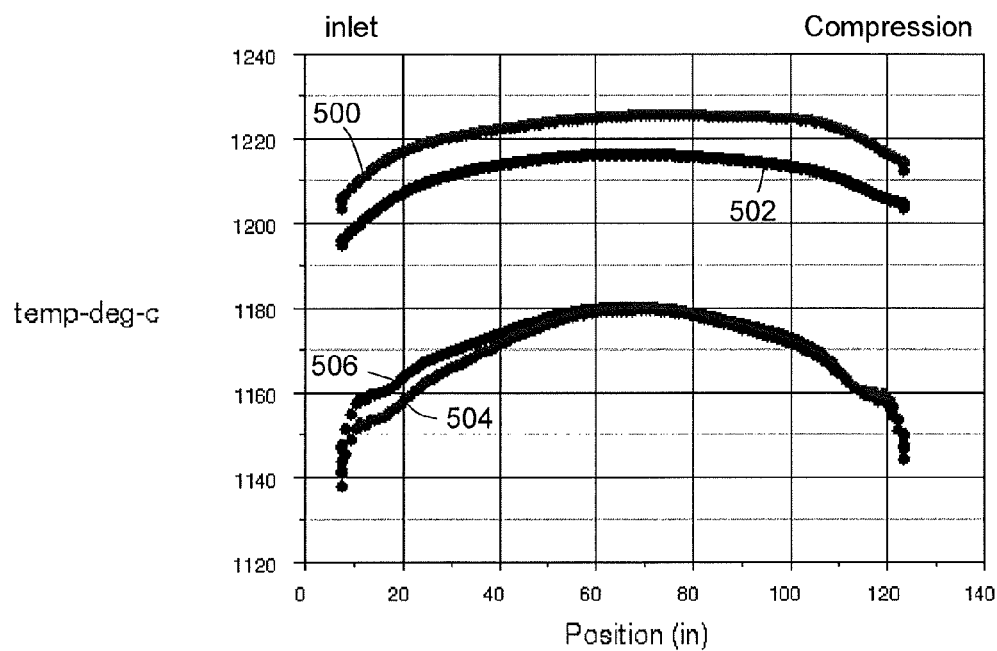
FIG. 10 is a plot showing the temperature across the width of the isopipe for the case of no insulating thermal barriers and the case of insulating thermal barriers between the bottom most heating elements and the next vertically adjacent heating element the weirs and at the root of the isopipe.

In another example shown in FIG. 10, temperature across the width of the isopipe was modeled for two cases: a base case without an insulating thermal barrier and; a second case with an insulating thermal barrier 48 between the bottom-most heating elements and the next vertically adjacent heating elements. The modeling examined the temperature at the glass input end of the isopipe, the midpoint of the isopipe and the isopipe end opposite the input end (the "compression" end). The results are shown in FIG. 10 for both the temperature at the break line and the root temperatures. Curves 500 and 502 show the temperature across the isopipe for the base case and the second case, respectively, at the break line. Curves 504 and 506 show the temperature across the isopipe for the base case and the second case, respectively, at the root. As illustrated by FIG. 10, the temperature at the break decreased across the width of the isopipe with the addition of the insulating thermal shield. In contrast, a comparison between curves 504 and 506 shows an increase in root temperature at the inlet end of the isopipe, while the temperatures at the mid point and compression end were substantially unchanged. Thus, the overall temperature differential between the break temperature and the root temperature decreased. With a lower break temperature (e.g. lower upper isopipe temperature), less isopipe material will dissolve. At the same time, by at least maintaining the root temperature, if not slightly increasing the root temperature, the potential for devitrification is reduced.

EXAMPLE 1

Figure 11:
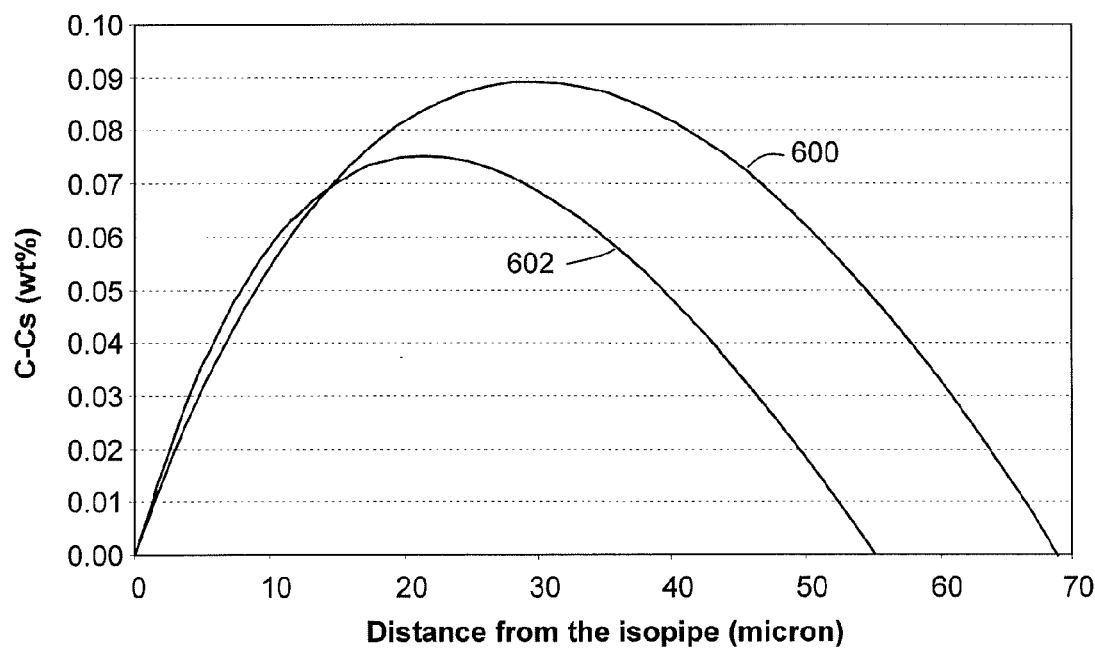
FIG. 11 is a plot showing a predicted decrease in the amount of secondary zircon in the presence of insulating thermal barriers between the bottom most heating elements and the next vertically adjacent heating element when compared to a base case having no insulating thermal barrier, plotted as a function of the concentration of $ZrO_2$ dissolved in the glass minus the saturation concentration of $ZrO_2$ for the glass, against the perpendicular distance into the glass from the glass-isopipe interface.

Shown in FIG. 11 are additional modeling data showing the predicted difference for the formation of precipitated zircon for a base case without a barrier (curve 600) and the case with an insulating thermal barrier between the bottom-most heating elements and the next vertically adjacent heating element (curve 602). The glass flow was assumed to be about 1500 pounds per hour. Isopipe temperatures at the weir, break and root for the base case, depicted by curve 600, were 1232° C., 1213° C. and 1153° C., respectively. The same temperatures with the insulating thermal shield (weir, break and root), depicted by curve 602, were 1228° C., 1205° C. and 1159° C., respectively. Precipitated zircon crystals ("secondary" zircon) form on the isopipe as a result of the supersaturation of $ZrO_2$ at the isopipe-glass interface as the glass melt flows over the isopipe. To determine the presence of supersaturation, it is necessary to know the $ZrO_2$ concentration profile in the glass melt and to compare that concentration to the actual concentration of $ZrO_2$ in the glass. Consequently, the left scale (y-axis) of the plot shows the concentration of $ZrO_2$ in the glass minus the saturation concentration of $ZrO_2$ in the glass. The horizontal or x-axis indicates the perpendicular distance from the surface of the isopipe in a direction into the glass melt. FIG. 11 shows that when an insulating thermal barrier is placed between the bottom-most heating element (e.g. element 44a) and the next vertically adjacent heating element (e.g. element 44b), the distance into the glass that secondary zircon will form is decreased, therefore limiting the growth of secondary zircon on the isopipe. That is, the distance zircon crystallization can occur from the surface of the isopipe is reduced as the availability of $ZrO_2$ is reduced or eliminated, thereby restricting the amount of growth a zircon crystal may undergo. FIG. 11 also shows that the concentration of $ZrO_2$ in the glass melt in excess of the saturation concentration is reduced with the use of the insulating thermal barrier.

EXAMPLE 2

Figure 12:
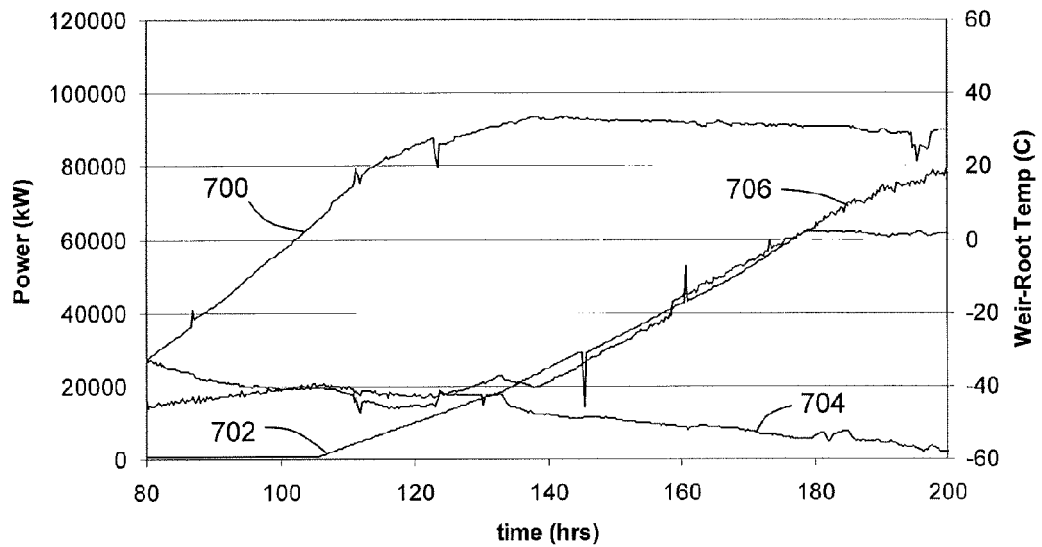
FIG. 12 is a chart showing the power supplied to the heaters of three zones within an exemplary prior art fusion draw machine during heat up of the isopipe, and a plot of the temperature differential between the upper and lower portions of the isopipe, as a function of time.

Shown in FIG. 12 is a chart plotting on the left hand axis power supplied to heating elements in kW, on the right hand axis the temperature differential between the weirs and the root, and along the bottom axis (x axis) time in hours for a conventional isopipe and enclosure. Four curves are shown: three curves representing the power supplied to three heating zones; one heating zone below the root (the "transition" zone), a lower muffle heating zone proximate the root (i.e. the "bottom-most" heating element as used herein, e.g. 12a), and an upper muffle heating zone (heaters above the bottom-most heating element, e.g. 12b, c and d). These curves are respectively referenced as curves 700, 702 and 704. Fourth curve 706 represents the temperature differential between the weirs and root of the isopipe.

Figure 13:
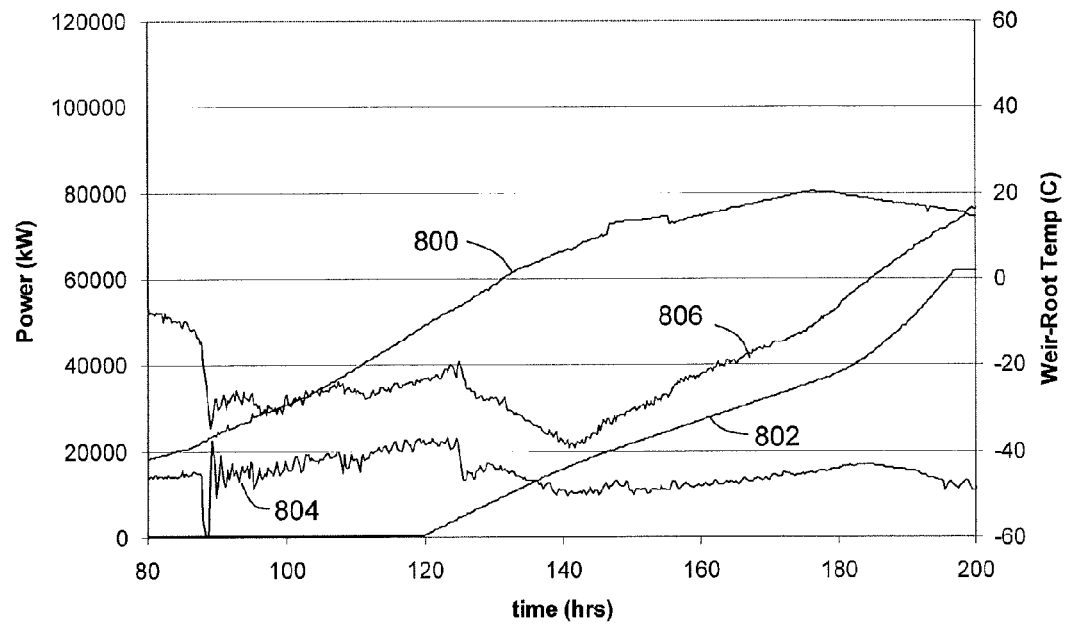
FIG. 13 is a chart showing the power supplied to the heaters of three zones within the exemplary prior art fusion draw machine of FIG. 12 after having insulation removed from upper portions of the machine (the top of the enclosure) during heat up of the isopipe, and a plot of the temperature differential between the upper and lower portions of the isopipe, as a function of time.

Shown in FIG. 13 is a chart plotting on the left hand axis power supplied to heating elements in kW, on the right hand axis the temperature differential between the weirs and the root, and along the bottom axis (x axis) time in hours for an isopipe and enclosure according to an embodiment of the present invention. Four curves are shown: three curves representing the power supplied to three heating zones; one heating zone below the root (the "transition" zone), a lower muffle heating zone proximate the root (i.e. the "bottom-most" heating element as used herein, e.g. 44a), and an upper muffle heating zone (heaters above the bottom-most heating element, e.g. 44b, c and d). These curves are respectively referenced as curves 800, 802 and 804. Fourth curve 806 represents the temperature differential between the weirs and root of the isopipe. In the fusion draw machine of FIG. 13, a layer of insulation was removed overtop the enclosure (e.g. enclosure 16).

A comparison between the fusion draw machines behind FIG. 12 and FIG. 13, which illustrate a heat up of their respective isopipes, shows that although the power balance between the various heating zones varied with the removal of insulation at the top of the enclosure, the temperature differential between the root and the weirs did not vary significantly.

Figure 14:
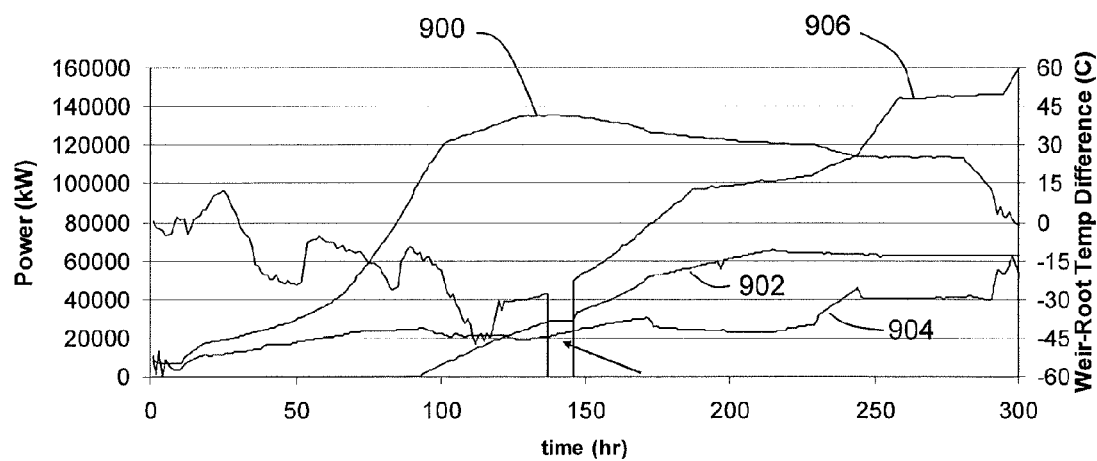
FIG. 14 is a chart showing the power supplied to the heaters of three zones within another exemplary fusion draw machine during heat up of the isopipe, and a plot of the temperature differential between the upper and lower portions of the isopipe, as a function of time.

Shown in FIG. 14 is a chart plotting on the left hand axis power supplied to heating elements in kW, on the right hand axis the temperature differential between the weirs and the root, and along the bottom axis (x axis) time in hours for another conventional isopipe and enclosure (e.g. enclosure 16). Four curves are shown: three curves representing the power supplied to three heating zones; one heating zone below the root (the "transition" zone), a lower muffle heating zone proximate the root (i.e. the "bottom-most" heating element as used herein, e.g. 12a), and an upper muffle heating zone (heaters above the bottom-most heating element, e.g. 12b, *c* and *d*). These curves are respectively referenced as curves 900, 902 and 904. Fourth curve 906 represents the temperature differential between the weirs and root of the isopipe. The arrow in FIG. 14 indicates the location in curve 906 of a thermocouple failure during the experiment.

Figure 15:
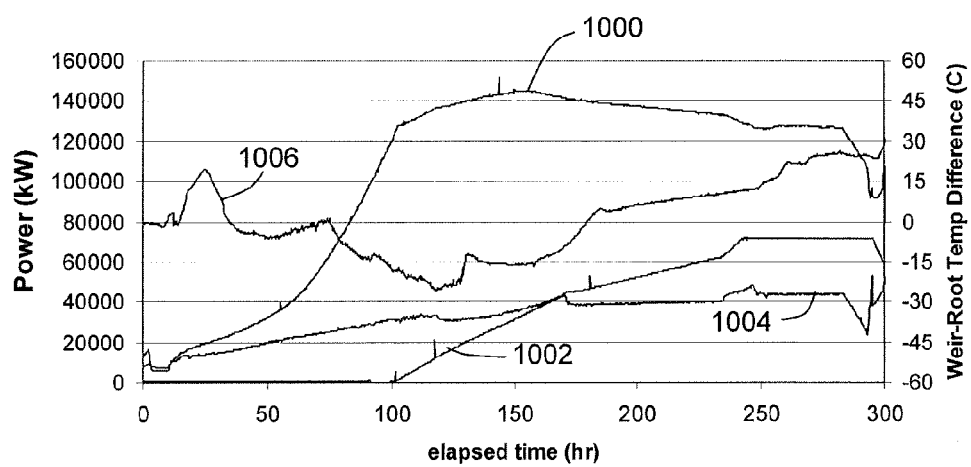
FIG. 15 is a chart showing the power supplied to the heaters of three zones within the exemplary fusion draw machine of FIG. 14 during heat up of the isopipe, and after an insulating thermal barrier was installed between the bottom-most isopipe heaters and adjacent heaters, and a plot of the temperature differential between the upper and lower portions of the isopipe, as a function of time. Insulation was also removed from above the isopipe.

Shown in FIG. 15 is a chart plotting on the left hand axis power supplied to heating elements in kW, on the right hand axis the temperature differential between the weirs and the root, and along the bottom axis (x axis) time in hours for an isopipe and enclosure (e.g. enclosure 40) according to an embodiment of the present invention. Four curves are shown: three curves representing the power supplied to three heating zones; one heating zone below the root (the "transition" zone), a lower muffle heating zone proximate the root (i.e. the "bottom-most" heating element as used herein, e.g. 44a), and an upper muffle heating zone (heaters above the bottom-most heating element, e.g. 44b, *c* and *d*). These curves are respectively referenced as curves 1000, 1002 and 1004. Fourth curve 1006 represents the temperature differential between the weirs and root of the isopipe. In the fusion draw machine behind FIG. 13, an insulating thermal barrier according to an embodiment of the present invention was installed between the bottom most heating elements (e.g. heaters 44a, 46a) and the adjacent heating elements (44b, 46b). The insulating thermal barrier comprises structural layer and an insulating layer. The non-insulating structural barrier was a hexaloy plate approximately 10 mm thick. The insulating barrier was a layer of Duraboard having a thickness of about 2.54 cm. Insulation was also removed from the top of the enclosure as was done for the fusion draw machine of FIG. 13. The insulating thermal barrier had an RSI of approximately 0.09 K*m2/W.

Both FIG. 14 and FIG. 15 show a heat up of their respective isopipes. A comparison between the curves of FIGS. 14 and 15 show a 50% decrease in the root to weir temperature differential with the additional of the insulating thermal barrier. The removal of insulation was not judged to have contributed significantly to this change, as indicated by the data of FIGS. 12 and 13. The large reduction in the weir-root temperature differential demonstrates the potential for greatly reduced thermal stresses during the heat up process, and a reduced risk of isopipe fracture.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for forming a glass sheet comprising:
flowing molten glass over a forming body comprising converging forming surfaces that converge at a bottom of the forming body, the forming body positioned within an enclosure;
heating the forming body with a plurality of heating elements separated from the forming body by an inner wall of the enclosure to form a temperature gradient between a temperature $T_1$ at a top of the forming body and a temperature $T_2$ at the bottom of the forming body, an insulating thermal barrier positioned between two adjacent heating elements of the plurality of heating elements;
drawing the molten glass from the bottom of the forming body to form a glass sheet; and
wherein the temperature $T_2$ at the bottom of the forming body is decoupled by the insulating thermal barrier from the temperature $T_1$ at the top of the forming body such that a change in $T_2$ does not cause a substantial change in $T_1$.

2. The method according to claim 1, wherein a 1° C./hour change in $T_2$ results in less than a 0.5° C./hour change in $T_1$.

3. The method according to claim 1, wherein a thermal resistance of the insulating thermal barrier is greater than about 0.0004 K·m²/W.

4. The method according to claim 3, wherein the thermal resistance of the insulating thermal barrier is greater than about 0.004 K·m²/W.

5. The method according to claim 1, wherein the glass sheet comprises less than about 0.3 inclusions per pound of finished glass.

6. The method according to claim 1, wherein the glass sheet comprises less than about 0.09 inclusions per pound of finished glass.

7. The method according to claim 1, wherein the insulating thermal barrier is positioned between a bottom-most heating element of the plurality of heating elements and a vertically adjacent heating element.

8. The method according to claim 1, wherein the heating comprises radiating more heat from ends of the plurality of heating elements than from centers of the heating elements.

9. The method according to claim 1, wherein the inner wall comprises an upper inner wall portion and a lower inner wall portion, the method further comprising heating the forming body by passing an electric current through the lower inner wall portion.

10. A method for forming a glass sheet comprising:
flowing molten glass over a forming body comprising converging forming surfaces that converge at a bottom of the forming body, the forming body positioned within an enclosure;
forming a temperature gradient between a temperature $T_1$ at a top of the forming body and a temperature $T_2$ at the bottom of the forming body by heating the forming body with a plurality of heating elements separated from the forming body by an inner wall of the enclosure, an insulating thermal barrier positioned between a bottom-most heating element of the plurality of heating elements and a vertically adjacent heating element of the plurality of heating elements;
drawing the molten glass from the bottom of the forming body to form a glass sheet; and
wherein the temperature $T_2$ at the bottom of the forming body is decoupled by the insulating thermal barrier from the temperature $T_1$ at the top of the forming body such that a 1° C./hour change in $T_2$ results in less than a 0.5° C./hour change in $T_1$.

11. The method according to claim 10, wherein the heating comprises radiating more heat from ends of the plurality of heating elements than from centers of the heating elements.

12. The method according to claim 10, wherein the glass sheet comprises less than about 0.3 inclusions per pound of finished glass.

13. The method according to claim 12, wherein the glass sheet comprises less than about 0.09 inclusions per pound of finished glass.

14. The method according to claim 10, wherein the inner wall comprises an upper inner wall portion and a lower inner wall portion, the method further comprising heating the forming body by passing an electric current through the lower inner wall portion.

15. The method according to claim 14, wherein the upper inner wall portion is separated from the lower inner wall portion by the insulating thermal barrier.

16. A method for forming a glass sheet comprising:
flowing molten glass over a forming body comprising converging forming surfaces that converge at a bottom of the forming body, the forming body positioned within an enclosure;
heating the forming body with a plurality of heating elements separated from the forming body by an inner wall of the enclosure to obtain a temperature $T_1$ at a top of the forming body and a temperature $T_2$ at the bottom of the forming body, an insulating thermal barrier horizontally positioned between two adjacent vertically spaced heating elements of the plurality of heating elements;
drawing the molten glass from the bottom of the forming body to form a glass sheet; and
wherein the temperature $T_2$ at the bottom of the forming body is decoupled by the insulating thermal barrier from the temperature $T_1$ at the top of the forming body such that a change in $T_2$ does not cause a substantial change in $T_1$.

17. The method according to claim 1, wherein a 1° C./hour change in $T_2$ results in less than a 0.5° C./hour change in $T_1$.

18. The method according to claim 16, wherein the insulating thermal barrier is positioned between a bottom-most heating element of the plurality of heating elements and a vertically adjacent heating element of the plurality of heating elements.

19. The method according to claim 16, wherein the glass sheet comprises less than about 0.09 inclusions per pound of finished glass.

20. The method according to claim 16, wherein the heating comprises radiating more heat from ends of the plurality of heating elements than from centers of the heating elements.

* * * * *